United States Patent [19]

Nakajima et al.

[11] Patent Number: 5,771,704
[45] Date of Patent: Jun. 30, 1998

[54] OPERATION CONTROL APPARATUS FOR AIR CONDITIONER

[75] Inventors: Hiroto Nakajima; Tetsuya Suda, both of Sakai, Japan

[73] Assignee: Daikin Industries, Ltd., Osaka, Japan

[21] Appl. No.: 356,270

[22] PCT Filed: Jun. 15, 1993

[86] PCT No.: PCT/JP93/00797

§ 371 Date: Dec. 15, 1994

§ 102(e) Date: Dec. 15, 1994

[87] PCT Pub. No.: WO93/25853

PCT Pub. Date: Dec. 23, 1993

[30] Foreign Application Priority Data

Jun. 17, 1992 [JP] Japan .................................. 4-157906

[51] Int. Cl.[6] .................................................. F24F 11/02
[52] U.S. Cl. ............................................. 62/228.4; 62/230
[58] Field of Search ............................... 62/228.1, 228.4, 62/228.5, 230, 126, 129, 157, 158, 231, 215

[56] References Cited

U.S. PATENT DOCUMENTS

| | | | |
|---|---|---|---|
| 4,735,058 | 4/1988 | Umezu et al. ................ | 62/228.4 X |
| 4,736,595 | 4/1988 | Kato .............................. | 62/230 X |
| 4,968,338 | 11/1990 | Sugiyama ..................... | 62/126 |
| 5,107,685 | 4/1992 | Kobayashi .................... | 62/230 X |
| 5,209,075 | 5/1993 | Kim . | |

FOREIGN PATENT DOCUMENTS

| | | |
|---|---|---|
| 2669433 | 11/1991 | France . |
| 60-152853 | 8/1985 | Japan . |
| 60-159543 | 8/1985 | Japan . |
| 62-111800 | 7/1987 | Japan . |
| 62-258965 | 11/1987 | Japan . |

OTHER PUBLICATIONS

Daikin Skyair Technical Guide, Jun. 1989, service parts list.

*Primary Examiner*—Harry B. Tanner

[57] ABSTRACT

A control apparatus of an air conditioner for stabilizing operating frequency of a compressor so as to prevent noise caused by hunting and to improve durability of the compressor. A frequency controller for controlling operating frequency of a compressor and a resistor for detecting an electric current flowing through the compressor are provided. A frequency reducer for reducing a frequency step of a compressor motor at a predetermined speed when a supply current of the compressor motor has reached a predetermined value and a frequency retainer for terminating frequency reducing operation of the frequency reducer when the supply current of the compressor motor has been decreased to the predetermined value and retaining a present frequency step until a predetermined period of time has elapsed are also provided. Also, a frequency increaser for increasing the frequency step at a speed lower than the predetermined speed until a predetermined period of time has elapsed when the frequency retaining operation of the frequency retainer is completed, so that the supply current of the compressor motor becomes the predetermined value, is provided.

3 Claims, 7 Drawing Sheets

OPERATION CONTROL APPARATUS FOR AIR CONDITIONER

TECHNICAL FIELD

The present invention relates to an operation control apparatus for an air conditioner, and in particular, to a current decreasing control of a motor for driving a compressor.

BACKGROUND ART

Conventionally, there has been an air conditioner wherein a compressor of which capacity is controlled by an inverter, a four-way directional control valve, an outdoor heat exchanger, an electrically operated expansion valve, and an indoor heat exchanger are serially connected to one another, and wherein a frequency of the inverter is controlled based on a temperature difference between a room temperature and a set temperature to control the capacity of the compressor by increasing and decreasing the capacity ('89 Daikin skyair technical guide <service parts list>, issued in June 1989, p. 244).

When a supply current to a motor built in the compressor reaches a specified value in a stage in which a high load is applied to the compressor, the operating frequency is reduced to prevent the supply current from abnormally increasing.

In the above-mentioned air conditioner, the control of the current supplied to the motor of the compressor is effected in a manner as follows. As shown in FIGS. 7(a) and 7(b), there is provided a decreasing interval X1 in which the operating frequency is reduced in steps when the supply current (DC current before the inverter) flowing through the motor of the compressor reaches a specified value Is lower than a peak current Im. There is further provided a retaining interval X2 in which the present operating frequency is retained for three minutes when the supply current reduces to a level below the specified value Is. After escaping from the retaining interval X2, the current control enters into a normal control operation.

However, in the above-mentioned current control operation, there is such a problem that the operating frequency of the motor hunts to cause noise which cyclically changes, offending the ear. Furthermore, there is another problem that the durability of the compressor reduces due to the hunting of the operating frequency.

SUMMARY OF THE INVENTION

The present invention was made in view of the aforementioned problems, and it is an object of the present invention to prevent noise created by the possible hunting of the operating frequency by stabilizing the operating frequency and to thus improve the durability of the compressor.

In order to achieve the aforementioned object, an embodiment of the present invention involves retaining an operating frequency at a specified value, and thereafter gradually increasing the operating frequency.

Practically as shown in FIG. 1, the measures of the invention relevant to a first embodiment is based on an air conditioner which includes a refrigerant circuit (9) constituted by serially connecting a variable-capacity compressor (1), a heat source side heat exchanger (3), an expansion mechanism (5), and a heat use side heat exchanger (6).

Then there is provided a frequency controller (41) for controlling capacity of the compressor (1) by changing at a predetermined speed an operating frequency for driving the compressor (1), and a current detector (R2) which detects a current flowing through of the compressor (1). There is further provided a frequency reducer means (42) which receives a detection signal from the current detector means (R2) and outputs a signal for reducing the operating frequency of the compressor (1) to the frequency controller (41) when a supply current of the compressor (1) reaches a specified value. There is further provided a frequency retainer means (43) which receives the detection signal from the current detector (R2), and when the supply current of the compressor (1) is reduced to a specified value, completes the frequency reducer, operation of the frequency reducing (42) and retains the present operating frequency until a specified time elapses. There is further provided a frequency increaser means (44) which outputs an increasing signal for increasing the operating frequency at a speed slower than the predetermined speed to the frequency controller (41) so that the supply current of the compressor (1) comes to have a specified value until a specified time elapses after the retaining operation of the frequency retainer (43) is completed.

The invention relevant to a second embodiment takes the measure of providing an increase counter (45) which receives the detection signal from the current detector (R2) and counts the number of increases of the supply current to the motor of the compressor (1) exceeding a specified value, an operation time lengthening unit (46) which lengthens the operation time of each of the frequency retainer (43) and the frequency increaser (44) accordingly as the count of the increase counter (45) increases.

According to a third embodiment, the operation time lengthening unit (46) lengthens the operation time of the frequency retainer (43) accordingly as the count of the increase counter (45) increases.

According to the invention of the first embodiment having the aforementioned arrangement, firstly in the refrigerant circuit (9), for example, a liquid refrigerant condensed and liquidized in the heat source side heat exchanger (3) is reduced in pressure in the expansion mechanism (5), and thereafter vaporized in the heat use side heat exchanger (6) to return to the compressor (1).

In the air conditioning operation, the frequency controller (41) changes the operating frequency of the compressor (1) at the predetermined speed to control the capacity of the compressor (1) by setting the operating frequency, for example, in such a manner that a discharge pipe temperature of the compressor (1) comes to have an optimum value.

In the air conditioning operation, the current detector (R2) detects the supply current of the compressor (1). A detection signal from the detection resistance (R2) is received by the frequency reducer (42), and when the supply current becomes not smaller than a specified value, a reduction signal at a specified speed is output to make the frequency controller (41) reduce the operating frequency. Subsequently, when the supply current becomes smaller than a specified value, the frequency retainer (43) retains the present operating frequency for a specified time.

When the frequency retainer (43) completes the retaining operation, the frequency increaser (44) outputs an increase signal to make the frequency controller (41) increase the operating frequency at a speed slower than the predetermined speed to suppress a rapid increase of the operating frequency.

Therefore, accordingly to the invention of the first embodiment, when the supply current of the compressor (1) becomes not smaller than the specified value, after reducing the operating frequency of the compressor (1), the present operating frequency is retained, and thereafter the operating frequency is made to gradually increase in the aforementioned manner. With the above-mentioned arrangement, the possible hunting of the operating frequency can be prevented to allow the operating frequency to be stabilized. As a result, the cyclical change of noise accompanying the change of the operating frequency can be suppressed. Therefore, the above-mentioned arrangement is able to achieve a reduction of noise and surely prevent the reduction of the durability of the compressor (1) due to the hunting of the operating frequency.

Furthermore, accordingly to the invention of the second embodiment, the increase counter (45) counts the number of increases of the supply current of the compressor (1). When the count of the increase counter increases, the operation time lengthening unit (46) lengthens the operation time of each of the frequency retainer (43) and the frequency increaser (44) to increase the cycle of change of the operating frequency.

Therefore, accordingly to the invention of the second embodiment, the operation time of each of the frequency retainer (43) and the frequency increaser (44) are lengthened accordingly to the number of increases of the supply current to allow the change of the operating frequency to be more surely suppressed. Therefore, the above-mentioned arrangement is able to achieve greater reduction of noise and more surely prevent the reduction of the durability of the compressor (1).

According to the invention of the third embodiment, the operation time of the frequency retainer (43) is lengthened accordingly to the number of increases of the supply current. Therefore, the above-mentioned arrangement is able to achieve a reduction of noise and improve the durability of the compressor (1).

DETAILED DESCRIPTION OF THE PREFERRED EMBODIMENTS

Embodiments of the present invention will now be described in detail with reference to the accompanying drawings.

Figure 2:
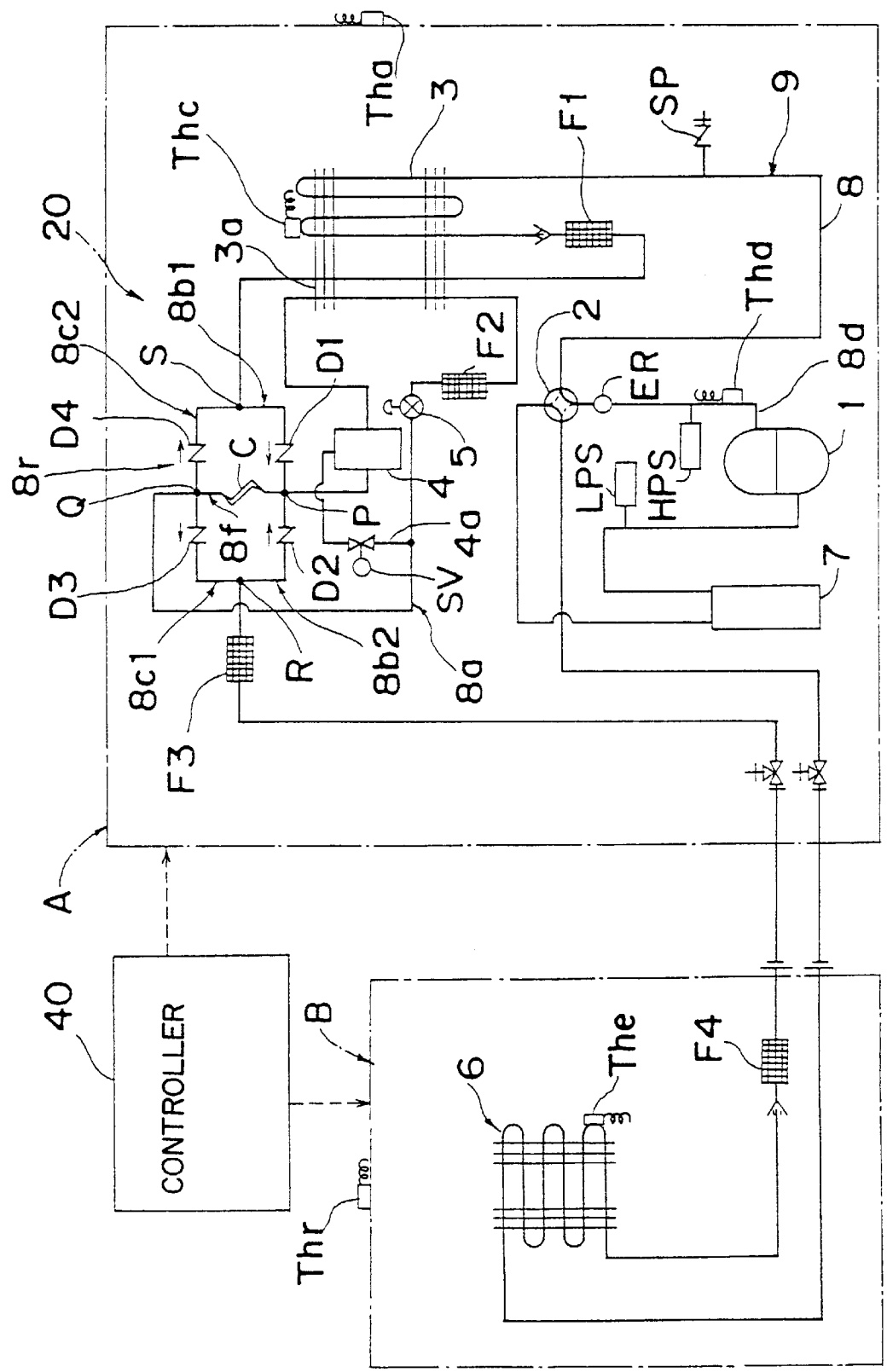
FIG. 2 is a refrigerant circuit diagram of a refrigerant pipeline system of an air conditioner.

FIG. 2 shows a refrigerant pipeline system of an air conditioner to which the present invention is applied. The air conditioner is so-called a separate type in which one indoor unit (B) is connected with one outdoor unit (A).

Figure 1:
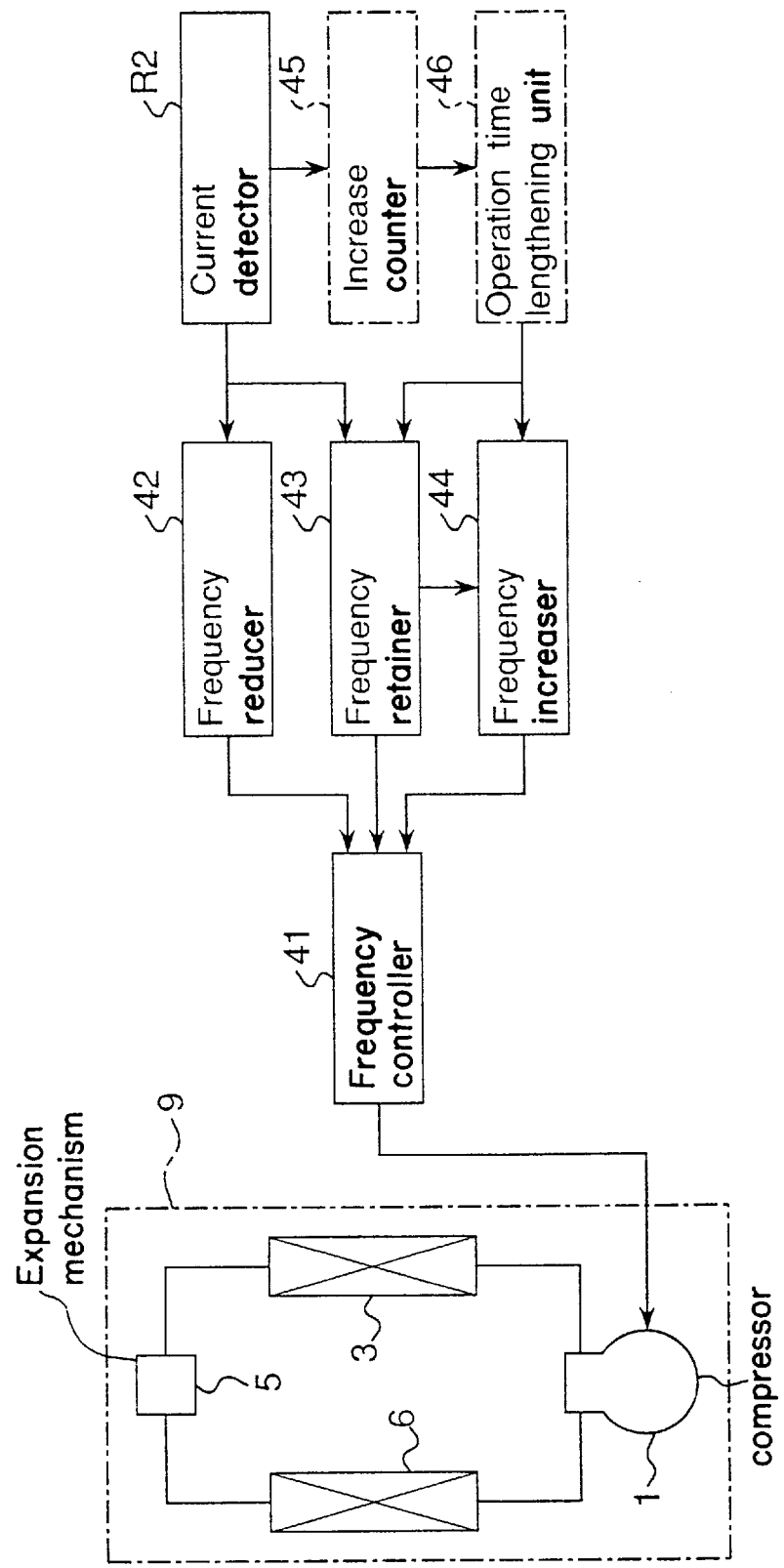
FIG. 1 is a block diagram of the construction of an embodiment of the present invention.

The outdoor unit (A) includes the main devices of: a scroll type compressor (1) of which operating frequency is variably controlled by an inverter; a four-way directional control valve (2) which switches in such a manner as indicated by the solid lines in FIG. 1 in the cooling operation, and switches in such a manner as indicated by the dashed lines in FIG. 1 in the heating operation; an outdoor heat exchanger (3) which is a heat source side heat exchanger functioning as a condenser in the cooling operation and as an evaporator in the heating operation; a pressure reducing section (20) which reduces pressure of refrigerant; and an accumulator (7) which intervenes in an inlet pipe of the compressor (1) and removes liquid refrigerant in intake refrigerant. The indoor unit (B) is provided with an indoor heat exchanger (6) which is a heat use side heat exchanger (6) functioning as an evaporator in the cooling operation and as a condenser in the heating operation. The compressor (1), four-way directional control valve (2), outdoor heat exchanger (3), pressure reducing section (20), indoor heat exchanger (6), and accumulator (7) are serially connected to constitute a refrigerant circuit (9) which effects thermal transfer through circulation of the refrigerant.

The pressure reducing section (20) includes a bridge rectifier circuit (8r) and a common passage (8a) connected to a pair of connection points (P and Q) in the rectifier circuit (8r). To the common passage (8a) are serially connected a receiver (4) for storing liquid refrigerant, an auxiliary heat exchanger (3a) of the outdoor heat exchanger (3), and an electrically operated expansion valve (5) which is an expansion mechanism having a function of reducing the pressure of the liquid refrigerant and a flow regulating function. To another pair of connection points (R and S) of the rectifier circuit (8r) are connected a piping (8) of the outdoor heat exchanger (3) and a piping (8) of the indoor heat exchanger (6). The rectifier circuit (8r) is equipped with: a first inflow passage (8b1) which connects the upstream connection point (P) of the common passage (8a) with the connection point (S) on the side of the outdoor heat exchanger (3) and is provided with a first check valve (D1) permitting the flow of the refrigerant only from the outdoor heat exchanger (3) to the receiver (4); a second inflow passage (8b2) which connects the upstream connection point (P) of the common passage (8a) with the connection point (R) on the side of the indoor heat exchanger (6) and is provided with a second check valve (D2) permitting the flow of the refrigerant only from the indoor heat exchanger (6) to the receiver (4); a first outflow line (8c1) which connects the downstream connection point (Q) of the common passage (8a) with the connection point (R) on the side of the indoor heat exchanger (6) and is provided with a third check valve (D3) permitting the flow of the refrigerant only from the electrically operated expansion valve (5) to the indoor heat exchanger (6); and a second outflow line (8c2) which connects the downstream connection point (Q) of the common passage (8a) with the connection point (S) on the side of the outdoor heat exchanger (3) and is provided with a fourth check valve (D4) permitting the flow of the refrigerant only from the electrically operated expansion valve (5) to the outdoor heat exchanger (3).

Across both the connection points (P and Q) of the common passage (8a) in the rectifier circuit (8r) is provided a liquid seal preventing bypass passage (8f) with interposition of a capillary tube (C). By virtue of the liquid seal preventing bypass line (8f), the possible liquid seal in the time of stopping the compressor (1) is prevented. Across an upper portion of the receiver (4) and the downstream of the common line (8a) is connected a gas discharging passage (4a) provided with an switch valve (SV). It is to be noted that the degree of reduction in pressure of the capillary tube (C) is made to be greater than that of the electrically operated expansion valve (5) to allow the refrigerant flow regulating function of the electrically operated expansion valve (5) to be retained in the normal operation.

There are further provided filters F1 through F4 for removing dust from the refrigerant, and a muffler (ER) for reducing the operation noise of the compressor (1).

The air conditioner is further provided with sensors. A sensor (Thd) is a discharge pipe sensor which is provided at a discharge pipe of the compressor (1) and detects a discharge pipe temperature Td. A sensor (Tha) is an outdoor inlet sensor which is provided at the air inlet of the outdoor unit (A) and detects an intake air temperature Ta, i.e., the outside air temperature. A sensor (Thc) is an outside heat exchange sensor which is provided at the outdoor heat exchanger (3) and detects an outside heat exchange temperature Tc which is a condensation temperature in the cooling operation and is an evaporation temperature in the heating operation. A sensor (Thr) is an indoor inlet sensor which is provided at the air inlet of the indoor unit B and detects an intake air temperature Tr, i.e., the room temperature. A sensor (The) is an inside heat exchange sensor which is provided at the indoor heat exchanger (6) and detects an inside heat exchange temperature Te which is an evaporation temperature in the cooling operation and is a condensation temperature in the heating operation. A sensor (HPS) is a high-pressure pressure switch which detects a high-pressure refrigerant pressure and is turned on accordingly to an excessive increases of the high-pressure refrigerant pressure to output a high-pressure signal. A sensor (LPS) is a low-pressure pressure switch which detects a low-pressure refrigerant pressure and is turned on accordingly to an excessive reduction of the low-pressure refrigerant pressure to output a low-pressure signal.

When the aforementioned refrigerant circuit (9) is in the cooling operation, the liquid refrigerant condensed and liquidized in the outdoor heat exchanger (3) flows from the first inflow passage (8b1) to be stored in the receiver (4) via the first check valve (D1), and then is reduced in pressure by the electrically operated expansion valve (5). Subsequently, the liquid refrigerant is vaporized in the indoor heat exchanger (6) via a first outflow passage (8c1), and returns to the compressor (1) to complete the refrigerant circulation. In the heating operation, the liquid refrigerant which is condensed and liquidized in the indoor heat exchanger (6) flows from a second inflow passage (8b2) to be stored in the receiver (4) via the second check valve (D2), and then is reduced in pressure by the electrically operated expansion valve (5). Subsequently, the liquid refrigerant is vaporized in the outdoor heat exchanger (3) via a second outflow passage (8c2), and returns to the compressor (1) to complete the refrigerant circulation.

Figure 3:
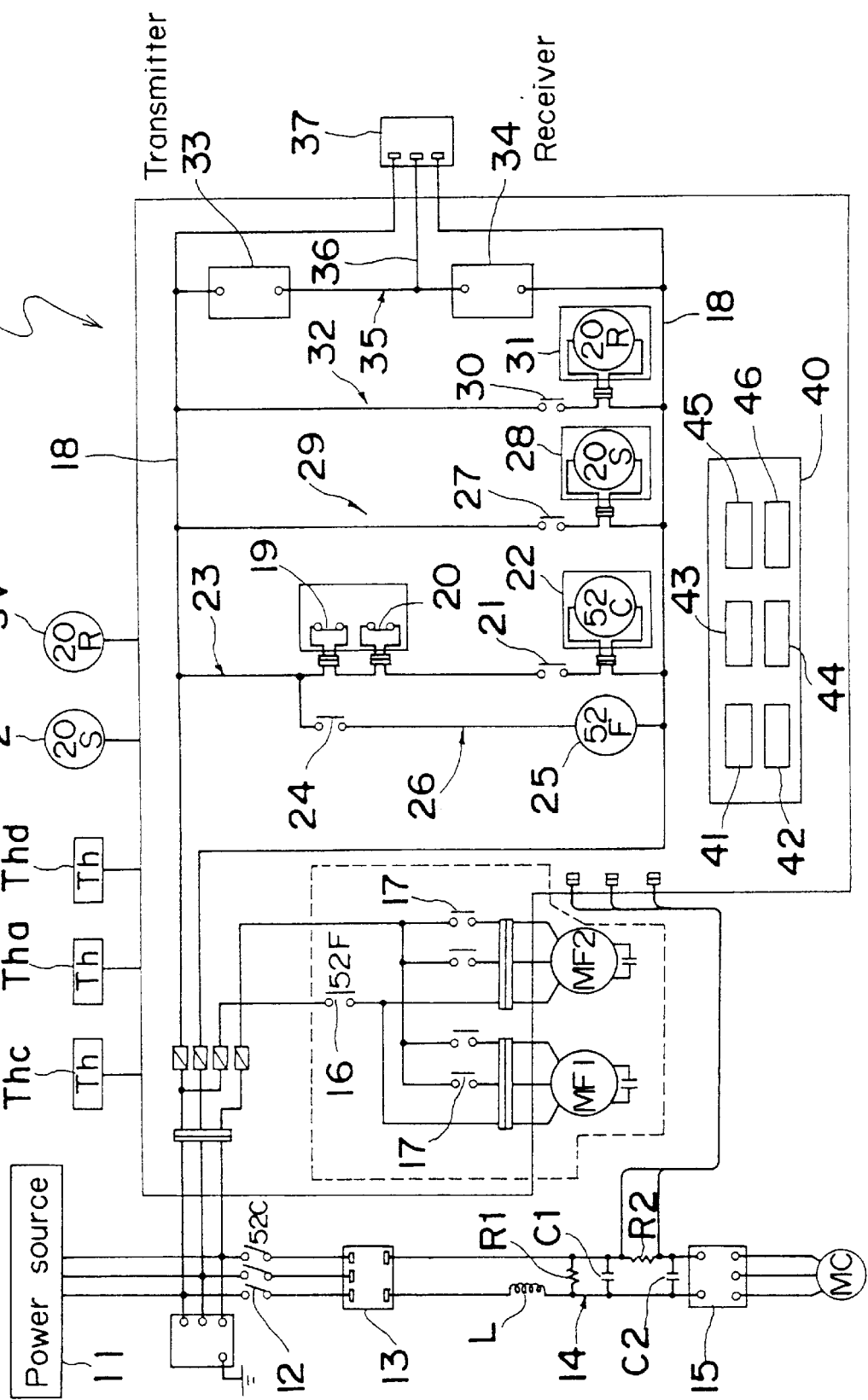
FIG. 3 is an electric circuit diagram of an outdoor control unit.

FIG. 3 shows an electric circuit of the outdoor control unit (10) for controlling the outdoor unit (A). In the electric circuit, a compressor motor (MC) is connected to a three-phase AC power source (11) by way of a solenoid switch (12), a rectifier (13), a DC circuit (14), and an inverter (15). Meanwhile, fan motors (MF1 and MF2) are connected across the S-phase line and T-phase line of the power source (11) via a solenoid switch (16) and a relay contact (17) for speed change control. To a power line (18) connected to the R-phase and the S-phase are connected a compressor switch circuit (23), a fan switch circuit (26), a switchover control circuit (29) and a switch control circuit (32) which are in parallel with one another. The compressor switch circuit (23) has the structure that pressure switches (19 and 20) operated in accordance with the high-pressure pressure switch (HPS) and the low-pressure pressure switch (LPS), a relay contact (21), and an excitation coil (22) of the solenoid switch (12) of the compressor motor (MC) are serially connected. The fan switch circuit (26) has the structure that a relay contact (24) and an excitation coil (25) of the solenoid switch (16) of the fan motors (MF1 and MF2) are serially connected. The switchover control circuit (29) has the structure that a relay contact (27), and an excitation coil (28) of the four-way directional control valve (2) are serially connected. The switch control circuit (32) has the structure that a relay contact (30) and an excitation coil (31) of the switch valve (SV) are serially connected.

The power line (18) is further connected with a transceiver circuit (35) having a transmitter (33) and a receiver (34), while a signal line (36) of the transceiver circuit (35) and the power line (18) are connected via a connector (37) to an indoor control unit (not shown) for controlling the indoor unit (B).

The DC circuit (14) is provided with a reactor (L), a resistor (R1), two capacitors (C1 and C2), and a detection resistor (R2) for detector a supply current flowing through the compressor motor (MC), where the detection resistor (R2) constitutes a current detection means.

On the other hand, the outdoor control unit (10) is provided with a controller (40). The controller (40) receives a detection signal of the supply current flowing through the detection resistor (R2) of the compressor motor (MC) and output signals from the aforementioned sensors (Thd through The) and the aforementioned switches (HPS and LPS), and controls the air conditioning operation based on the signals.

The controller (40) as illustrated in FIG. 1 is provided with a frequency controller (41) of the compressor motor (MC) characteristic of the present invention, and further provided with a frequency reducer (42) for controlling the supply current of the compressor motor (MC), a frequency retainer (43), a frequency increaser (44), an increase counter (45), and an operation time lengthening unit (46).

The a frequency controller (41) ranks the operating a frequency of the inverter (15) in 20 steps N ranging from 0 to the maximum operating a frequency, and sets up each a frequency step N based on the discharge pipe temperature (Td) to control the capacity of the compressor (1).

Figures 6A, 6B:
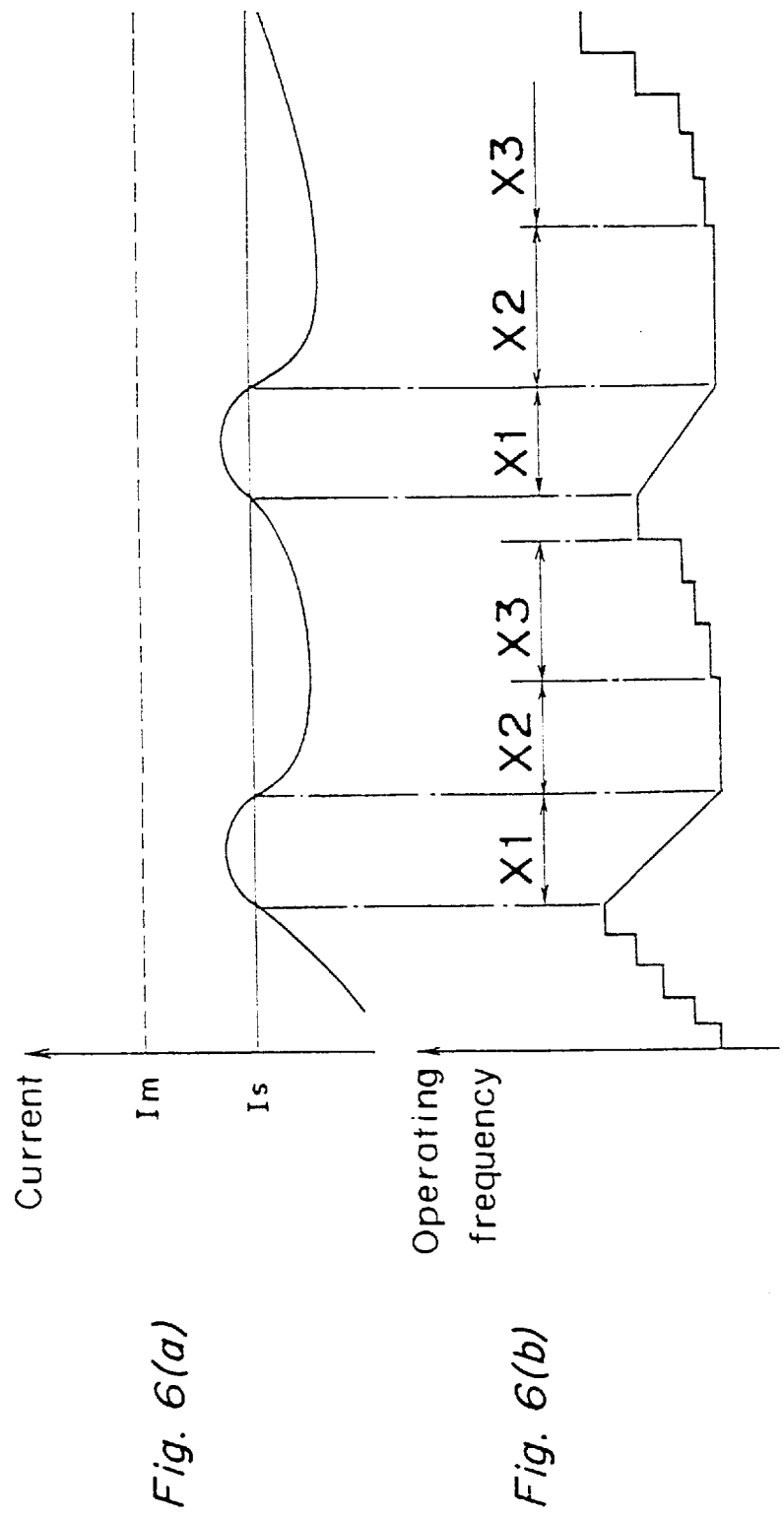
FIGS. 6(a) and 6(b) are characteristic charts of a supply current and a frequency step N of a motor of a compressor.
Figures 7A, 7B:
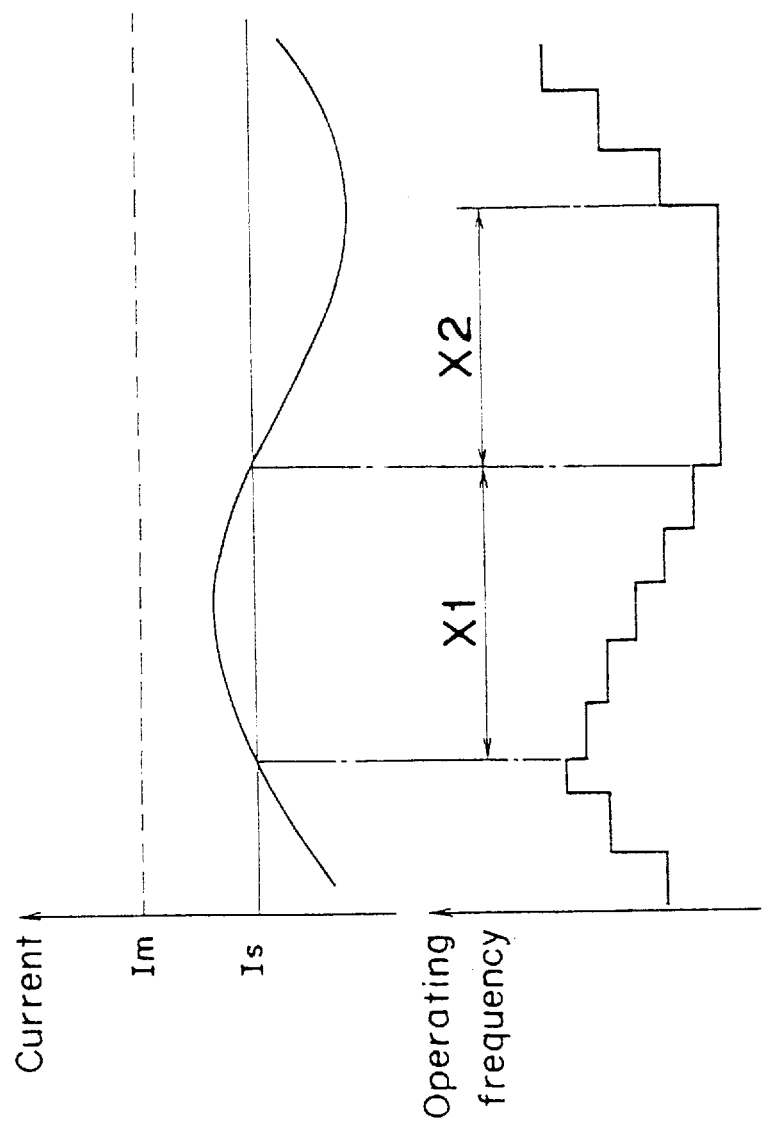
FIGS. 7(a) and 7(b) are characteristic charts of a supply current and a frequency step N of a motor of a conventional compressor.

The a frequency reducer (42) has a construction in which it receives the detection signal from the detection resistor (R2) and, when the supply current of the compressor motor (MC) reaches a specified value Is, e.g., 14 A as shown in FIG. 6, a reduction signal for reducing the operating a frequency of the inverter (15) is output to the a frequency controller (41) (refer to the decreasing interval X1 in FIG. 6). The a frequency retainer (43) receives the detection signal from the detection resistor (R2), and completes the reducing operation of the a frequency reducer (42) when the supply current of the compressor motor (MC) is reduced to the specified value Is, and retains the present operating a frequency until a specified time elapses (refer to the retainer interval X2 in FIG. 6). The a frequency increasing unit (44) has such a construction in which, when the retainer operation of the a frequency retainer (43) is completed, there is output to the a frequency controller (41) an increases signal which gradually increases the operating a frequency so that the supply current of the compressor motor (MC) becomes the specified value Is when a specified time elapses (refer to an alleviating interval X3 in FIG. 6). The increases counter (45) has a construction in which it receives the detection signal from the detection resistor (R2) and counts the number of increases of the supply current of the compressor motor (MC) exceeding the specified value Is. The operation time lengthening unit (46) has a construction in which it lengthens the operation time of each of the a frequency retainer (43) and the a frequency increaser (44) accordingly as the count of the increases counter (45) increases.

Figure 4:
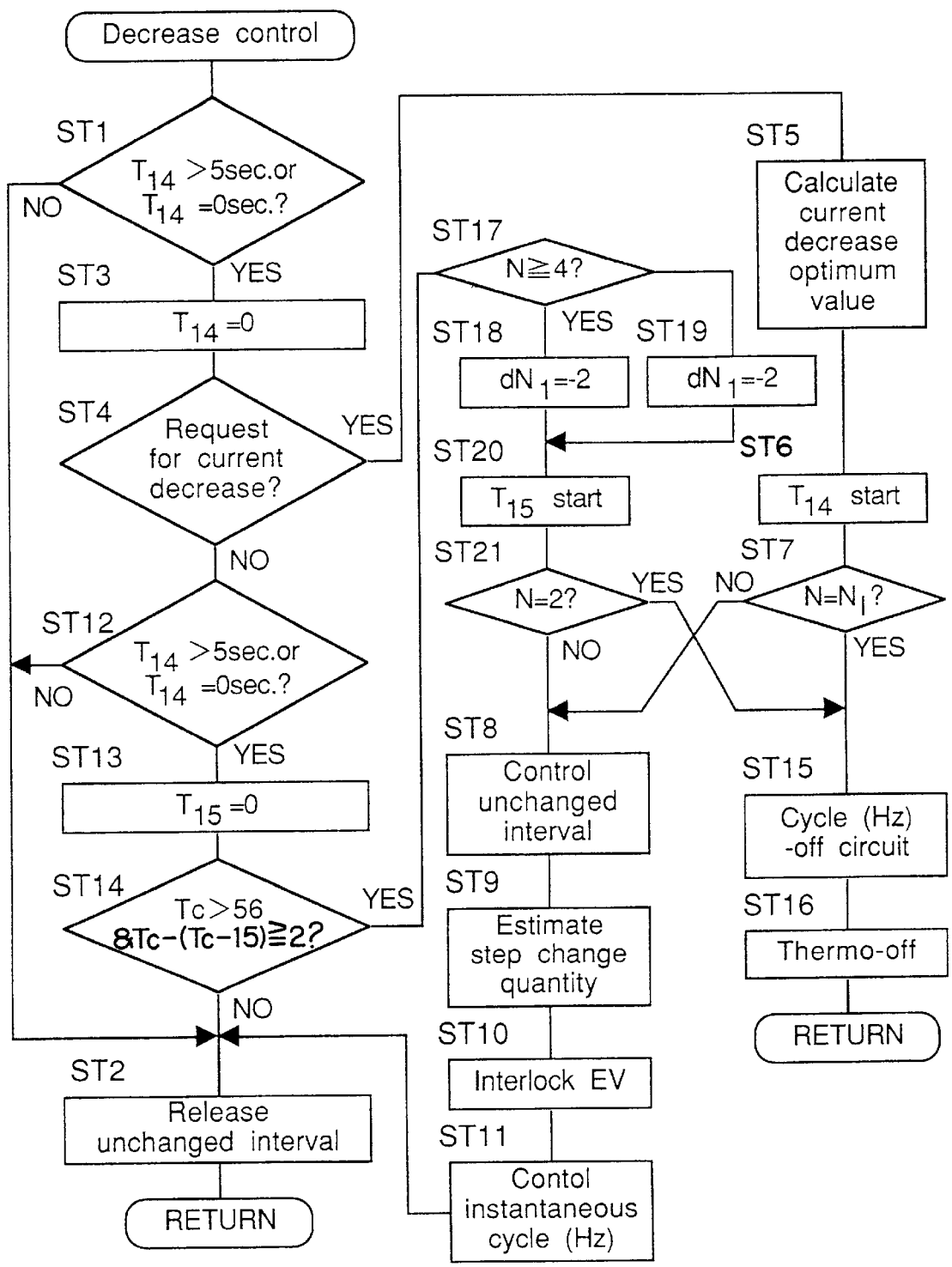
FIG. 4 is a control flow chart of a current decreasing operation.

Then the following describes the operation of controlling the current of the compressor motor (MC) based on a control flow as shown in FIG. 4.

In the air conditioning operation, it is firstly decided whether a count of a timer T14 exceeds five seconds or whether it remains as being zero seconds at step ST1, i.e., it is decided whether or not the timer T14 which has started counting at step ST6 described hereinafter has counted five seconds. Until the set time elapses, the program flow proceeds from step ST1 to step ST2 to execute the process of releasing the unchanged interval of the compressor motor (MC) characteristic of the present invention, and then the program flow returns. When the supply current of the compressor motor (MC) is normal, the a frequency controller (41) sets a frequency step N based on the discharge pipe temperature Td and controls the capacity of the compressor (1).

When the set time of the timer T14 elapses, the program flow proceeds from step ST1 to step ST3 to reset the timer T14, and then the program flow proceeds to step ST4 to decide whether or not a request for decreasing the current is issued. In other words, the a frequency reducer unit (42) which receives a detection signal from the detection resistor (R2) decides whether or not the supply current of the compressor motor (MC) exceeds a specified value. For instance, when the supply current exceeds a specified value Is of 14 A as shown in FIG. 6, the result of decision at step ST4 is YES (affirmative) to make the program flow proceed to step ST5. At step ST5, an optimum value of the current decrease is calculated, the a frequency step N to be reduced by the a frequency reducer (42) is set at 2 steps, and an increases inhibition flag F9 described hereinafter is set. Thereafter, the program flow proceeds to step ST6 to start the timer T14 and then proceeds to step ST7 to decide whether or not the present a frequency step N is a minimum current step N1. When the present a frequency step N is not the minimum current step N1, the program flow proceeds from step ST7 to step ST8.

Subsequently, the process in the unchanged interval of the compressor (1) is executed at step ST8. When the count values of timers T23 and T3 are zero, the timers T23 and T3 are started. Every time the supply current exceeds the specified value Is, the increases counter (45) adds 1 to the count of a counter C2, and then the quantity of change of the a frequency step N is estimated as interlocked with the electrically operated expansion valve (5). Then at step ST10, the electrically operated expansion valve (5) is interlocked, and the operating a frequency of the compressor motor (MC) is controlled at step ST11. In other words, the operating a frequency is reduced by two steps based on the a frequency step N set at step ST5. Subsequently, the program flow is to return to step ST2 to execute the process of releasing the unchanged interval. However, if the supply current of the compressor motor MC is presently increased, the program flow directly returns to repeat the above-mentioned operations.

In other words, when the supply current of the compressor motor (MC) exceeds the specified value Is in a manner as shown in FIG. 6, the a frequency step N is to be reduced by two steps at step ST5, and the a frequency step N is reduced by two steps every five seconds until the supply current is reduced below the specified value Is to achieve the current decreasing interval X1.

Subsequently, when the supply current of the compressor motor (MC) is reduced to a value not greater than the specified value Is, the result of decision at step ST4 is NO (negative), and it is decided whether or not the outside heat exchange temperature Tc, i.e., the condensation temperature has steeply increased at steps ST12 through ST14. In more detail, the program flow proceeds to step ST2 until the timer T15 counts 15 seconds to execute the above-mentioned operation. Meanwhile, when the count of the timer T15 has counted 15 seconds or remains zero, it is decided whether the outside heat exchange temperature Tc has exceeded 56° C. as increased by 2° C. in 15 seconds. When there is no steep increase, the program flow proceeds from step ST14 to step ST2.

Figure 5:
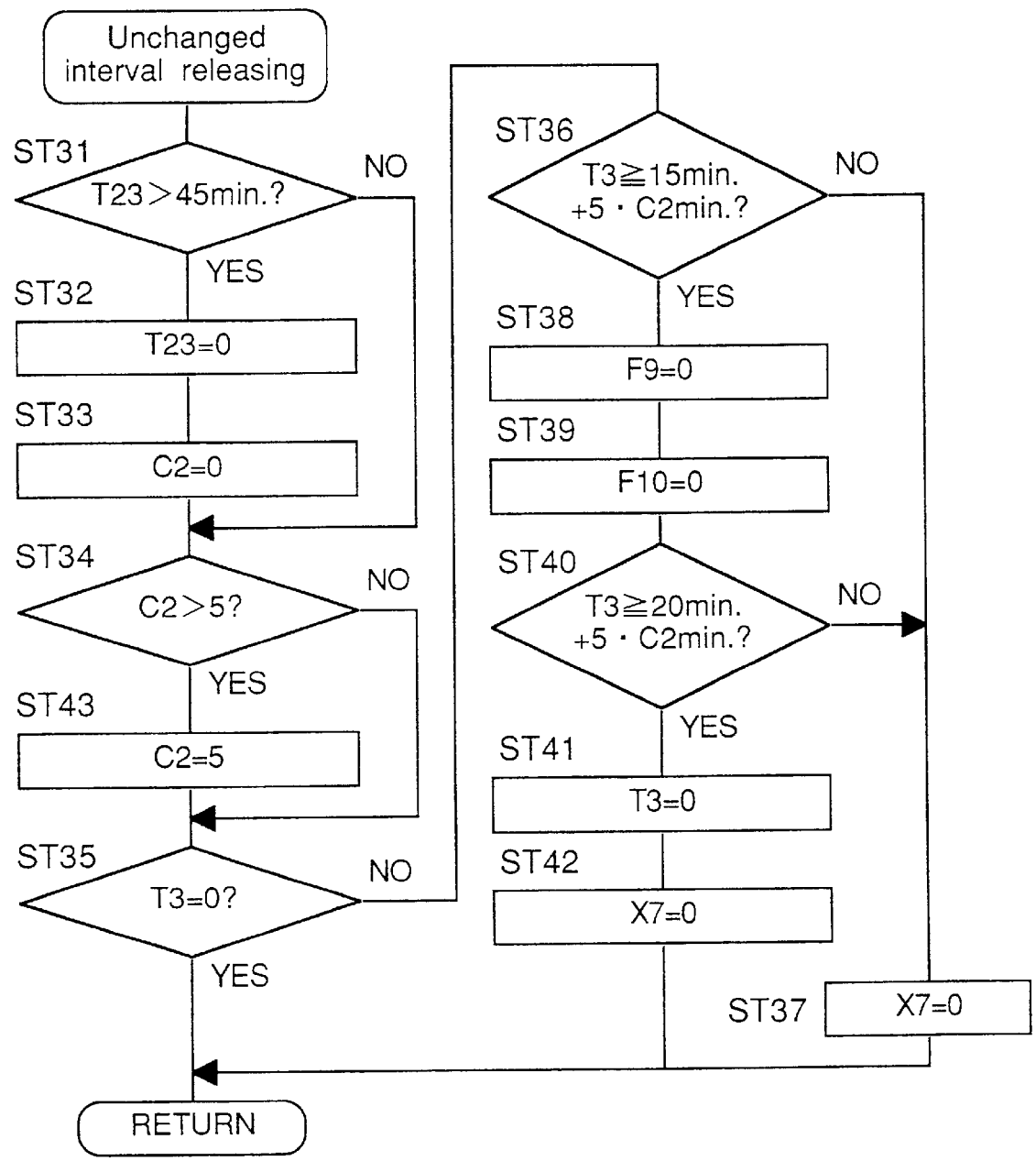
FIG. 5 is a control flow chart of an unchanged interval releasing operation.

Then reference is made to the process of releasing the unchanged interval at step ST2 characteristic of the present invention with reference to FIG. 5.

First, when the program flow proceeds to step ST2, it is decided whether or not a timer T23 has counted 45 minutes at step ST31. Since the timer T23 is set at 0 in the normal condition in which there is no request for decreasing the current at step ST4 and the outside heat exchange temperature Tc is not steeply increased at step ST14, the program flow proceeds to step ST34. When the count of the timer T23 exceeds 45 minutes at step ST31, the program flow proceeds to step ST32 to reset the timer T23, then proceeds to step ST33 to reset the counter C2, and then proceeds to step ST34. The timer T23 counts the maximum time of executing the process of releasing the unchanged interval. When the supply current of the compressor motor (MC) once exceeds the specified value Is, the timer T23 is to start at step ST8, while the counter C2 is counting the number of times of the supply current exceeding the specified value Is in 45 minutes of the timer T23.

Subsequently, it is decided whether or not the count of the counter C2 exceeds the number 5 at step ST34. Since the count is 0 in the normal operation, the program flow proceeds from step ST34 to step ST35 to decide whether the count of the timer T3 is 0 or not. Since the count of the timer T3 is 0 in the normal operation, the program flow returns from step ST35 to the flow shown in FIG. 4.

When the supply current of the compressor motor (MC) firstly exceeds the specified value Is, the timers T23 and T3 start counting at step ST8. Therefore, the results of decision at steps ST31, ST34, and ST35 are each NO when the program flow proceeds from step ST11 to step ST2. Therefore, the program flow proceeds from step ST35 to step ST36 to decide whether or not the timer T3 has counted a time obtained by adding 5×C2 minutes to 15 minutes. In practice, the counter C2 is counting the number of increases of the supply current exceeding the specified value Is in 45 minutes. Therefore, it is decided whether or not the timer T3 has counted 20 minutes in an initial increases stage, and it is decided whether or not the timer T3 has counted 25 minutes in a second increases stage, thus lengthening the retainment time of the a frequency retainer (43) according to an increase in the number of increases.

Since the result of decision at step ST36 is NO until the timer T3 completes the counting for a specified time, the program flow proceeds to step ST37 to set a flag X7 at zero, and the program flow returns to the flow shown in FIG. 4. When the flag X7 is zero, the operating a frequency of the compressor motor (MC) is increased one step by one step every two minutes. In more detail, the increases inhibition flag F9 of the a frequency step N is set at step ST5 while the operating a frequency is reducer in steps at step ST5. Therefore, the program flow returns without increasing the a frequency step N at step ST37.

When the a frequency step N is reduced to make the supply current of the compressor motor (MC) smaller than the specified value Is, the program flow proceeds from step ST4 to step ST2 via steps ST12 through step ST14. In the above-mentioned case, the program flow also proceeds from step ST36 to step ST37. Since the increases inhibition flag F9 is set, the a frequency retainer (43) retains the present a frequency step N to achieve the retaining interval X2 until the timer T3 completes the counting for the specified time.

Subsequently, when the timer T3 completes the counting for the specified time at step ST36, e.g., when 20 minutes has elapsed in the initial increases stage, the program flow proceeds from step ST36 to step ST38 and ST39 to reset the increases inhibition flag F9 and a reduction inhibition flag F10 of the a frequency step N. Then the program flow proceeds to step ST40 to decide whether or not the timer T3 has counted the time obtained by adding 5×C2 minutes to 20 minutes. In practice, the counter C2 is counting the number of increases of the supply current exceeding the specified value Is in 45 minutes in the same manner as in the step ST36. Therefore, it is decided whether or not the timer T3 has counted 25 minutes in the initial increases stage, and it is decided whether or not the timer T3 has counted 30 minutes in the second increases stage to secure the increases time of 5 minutes of the a frequency increaser (44) even when the retainment time of the a frequency retainer. (43) is lengthened according to an increase in the number of increases.

Since the result of decision at step ST40 is NO until the timer T3 completes the counting for the specified time, the program flow proceeds to step ST37 to set the flag X7 at zero, and the program flow returns to the flow shown in FIG. 4. In the present case, since the increases inhibition flag F9 is reset at step ST38, the operating a frequency is increased one step by one step every two minutes to achieve the operation in an alleviating interval X3, and the program flow returns. In more detail, the supply current of the compressor motor (MC) is increasing in the present condition, meaning that a high load is applied. In the normal control operation, since the a frequency step N is steeply increasing, the a frequency step N is made to have the maximum value within an operable range so that the increases is alleviated. It is to be noted that the operating a frequency of the compressor motor (MC) is to be reduced when the load is reduced.

The operation of increasing the a frequency step N is continued until the timer T3 completes the counting for the specified time, and after the specified time elapses, the result of decision at step ST40 is YES. Then the program flow proceeds to step ST41 and ST42 to reset the timer T3 and the flag X7, and then returns to the normal control operation.

Subsequently, when the supply current exceeds again the specified value Is before the time when the timer T23 counts 45 minutes, the counter C2 is incremented to make the operation time lengthening unit (46) lengthen the retainment time of the a frequency retainer (43) five minutes by five minutes at steps ST36 and ST40. When the count of the counter C2 exceeds the number 5, the result of decision at step ST34 is YES to make the program flow proceed to step ST43 and then to step ST35 while maintaining the count of the counter C2 at the number 5. In other words, there is executed a maximum of five times of the lengthening operation by the operation time lengthening unit (46), and thereafter the decisions at steps ST36 and ST40 are executed in the condition where the count of the counter C2 is maintained at 5 to thereby execute the above-mentioned operations.

When the a frequency step N of the compressor motor (MC) is the minimum current step N1 at step ST7 in FIG. 4, the result of decision is YES to make the program flow proceed to step ST15 at which the a frequency turning-off circuit is operated to stop the operation of the compressor (1). Subsequently, the program flow proceeds to step ST16 to achieve a thermo-off condition, and then returns to the main flow.

When it is decided that the outside heat exchange temperature Tc exceeds 56° C. and increases by not smaller than 2° C. in 15 seconds, the program flow proceeds from step ST14 to step ST17 to decide whether or not the a frequency step N is not smaller than 4. When the a frequency step N is not smaller than 4, the a frequency step N is so set as to be reduced by two steps at step ST18. When the a frequency step N is not greater than 3, the a frequency step N is so set as to be reduced by one step at step ST19. Subsequently, the program flow proceeds to step ST20 to start the timer T15, and thereafter proceeds to step ST21 to decide whether the a frequency step N is 2 or not. When the a frequency step N is not smaller than 2, the program flow proceeds to step ST8 to reduce the a frequency step N. When the a frequency step N is 2, i.e., the minimum step, the program flow proceeds to step ST15 to achieve a thermo-off condition.

Therefore, accordingly to the present embodiment, when the supply current of the compressor motor (MC) exceeds the specified value Is, the a frequency step N of the compressor (1) is reduced, thereafter the present a frequency step N is retained, and then the a frequency step N is increased. The above-mentioned arrangement can prevent the possible hunting of the operating a frequency to allow the operating a frequency to be stabilized. As a result, the cyclical change of noise accompanied by the change of the operating a frequency can be suppressed, which allows a noise reduction to be achieved and allows the possible reduction in durability of the compressor (1) due to the hunting of the operating a frequency to be securely prevented.

Furthermore, since the operation time of the a frequency retainer (43) is increased accordingly to the number of increases of the supply current, the change of the operating a frequency can be further suppressed, which allows a noise reduction to be achieved and allows the possible reduction in durability of the compressor (1) due to the hunting of the operating a frequency to be more securely prevented.

Although the aforementioned embodiments are each described based on a separate type air conditioner, the present invention is of course applicable to a variety of air conditioners.

Although the current detector is implemented by the detection resistor (R2), the current detector is not limited to the above-mentioned resistor.

The present invention may be utilized in an air conditioner having a compressor of which capacity is controlled by an inverter.

What is claimed is:

1. An operation control apparatus for an air conditioner which includes a refrigerant circuit constituted by serially connecting a variable-capacity compressor, a heat source side heat exchanger, an expansion mechanism, and a heat use side heat exchanger, and additionally includes frequency control means for controlling capacity of the compressor by changing an operating frequency of a motor for driving the compressor at a predetermined rate of change in speed so that the operating frequency becomes a frequency corresponding to a load, the operation control apparatus comprising:

current detecting means for detecting a current flowing through the motor of the compressor;

frequency reducing means for receiving a detection signal from the current detecting means, and when a supply current of the compressor reaches a specified value, outputting a reduction signal for reducing the operating frequency of the motor to the frequency control means;

frequency retaining means for receiving the detection signal from the current detecting means, and when the supply current of the compressor is reduced to the specified value, making the frequency reducing means complete a frequency reducing means operation and retain a present operating frequency until a specified time elapses; and frequency increasing means for outputting an increases signal for increasing the operating frequency of the motor at a rate of change in speed slower than the predetermined rate of change in speed to the frequency control means so that the supply current of the compressor comes to have the specified value in a specified time after a retaining operation of the frequency retaining means is completed.

2. An operation control apparatus for an air conditioner which includes a refrigerant circuit constituted by serially connecting a variable-capacity compressor, a heat source side heat exchanger, an expansion mechanism, and a heat use side heat exchanger, and additionally includes frequency control means for controlling capacity of the compressor by changing an operating a frequency of a motor for driving the compressor at a predetermined rate of change in speed so that the operating frequency becomes a frequency corresponding to a load, the operation control apparatus comprising:

current detecting means for detecting a current flowing through the motor of the compressor;

frequency reducing means for receiving a detection signal from the current detecting means, and when a supply current of the compressor reaches a specified value, outputting a reduction signal for reducing the operating a frequency of the motor to the frequency control means;

frequency retaining means for receiving the detection signal from the current detecting means, and when the supply current of the compressor is reduced to the specified value, making the frequency reducing means complete a frequency reducing means operation and retain a present operating frequency until a specified time elapses;

frequency increasing means for outputting an increases signal for increasing the operating frequency at a rate of change in speed slower than the predetermined rate of change in speed to the frequency control means so that the supply current of the compressor comes to have the specified value in a specified time after a retaining operation of the frequency retaining means is completed;

increase counting means for receiving the detection signal from the current detecting means, and counting a number of increases of the supply current of the compressor exceeding the specified value; and operation time lengthening means for lengthening an operation time of each of the frequency retaining means and the frequency increasing means as the count of the increase counting means increases.

3. An operation control apparatus for an air conditioner which includes a refrigerant circuit constituted by serially connecting a variable-capacity compressor, a heat source side heat exchanger, an expansion mechanism, and a heat use side heat exchanger, and additionally includes frequency control means for controlling capacity of the compressor by changing an operating frequency of a motor for driving the compressor at a predetermined rate of change in speed so that the operating a frequency becomes a frequency corresponding to a load, the operation control apparatus comprising:

current detecting means for detecting a current flowing through the motor of the compressor;

frequency reducing means for receiving a detection signal from the current detecting means, and when a supply current of the compressor reaches a specified value, outputting a reduction signal for reducing the operating frequency of the motor to the frequency control means;

frequency retaining means for receiving a detection signal from the current detecting means, and when the supply current of the compressor is reduced to the specified value, making the frequency reducing means complete a frequency reducing operation and retain a present operating frequency until a specified time elapses;

a frequency increasing means for outputting an increases signal for increasing the operating frequency at a rate in change of speed slower than the predetermined rate of change in speed to the frequency control means so that the supply current of the compressor comes to have the specified value in a specified time after a retaining operation of the frequency retaining means is completed;

increase counting means for receiving the detection signal from the current detecting means, and counting a number of increases of the supply current of the compressor exceeding the specified value; and operation time lengthening means for lengthening an operation time of the frequency retaining means as the count of the increase counting means increases.

* * * * *